United States Patent [19]

Stalder et al.

[11] Patent Number: 4,646,777
[45] Date of Patent: Mar. 3, 1987

[54] FLAT SLIDE VALVE WITH NOTCHED GUIDE STRIPS

[75] Inventors: Hans Stalder; Hans Sidler, both of Eschenbach, Switzerland

[73] Assignee: SISTAG Maschinenfabrik Sidler Stalder AG, Switzerland

[21] Appl. No.: 806,777

[22] Filed: Dec. 9, 1985

[30] Foreign Application Priority Data

Dec. 19, 1984 [CH] Switzerland ............... 6034/84

[51] Int. Cl.⁴ .................. F16K 3/316; F16K 25/00
[52] U.S. Cl. .................................. 137/242; 137/237; 251/327; 251/329
[58] Field of Search ............... 251/326, 327, 328, 329; 137/237, 242

[56] References Cited

U.S. PATENT DOCUMENTS

| | | | |
|---|---|---|---|
| 2,000,853 | 5/1935 | Lange | 137/244 |
| 2,060,571 | 11/1936 | Hanson | 137/244 |
| 2,774,371 | 12/1956 | Grannenfelt | 251/328 X |
| 3,917,223 | 11/1975 | Sidler et al. | 251/328 X |
| 4,522,224 | 6/1985 | Stalder et al. | 137/242 |
| 4,546,788 | 11/1985 | Stalder et al. | 137/242 |

Primary Examiner—Martin P. Schwadron
Assistant Examiner—John S. Starsiak, Jr.
Attorney, Agent, or Firm—McGlew and Tuttle

[57] ABSTRACT

A guide slot for a valve plate is bounded on both sides by guide strips projecting into a flow channel of a valve housing for the plate. These guide strips contain notches at intervals. The notches of one guide strip are offset relative to the notches of the other guide strip. When the valve is open, medium entering the guide slot through the notches on the inflow side is deflected in the guide slot before it leaves the guide slot again through the offset notches on the outflow side. This generates in the guide slot a lengthwise current leading to a self-cleaning action for combatting deposits. During the valve plate closing process, a permanent self-cleaning takes place over the entire closing travel zone. For this reason, the valve is particularly well suited for use in conveyor lines for thickish, powdery, granular or solids-containing media.

6 Claims, 5 Drawing Figures

FLAT SLIDE VALVE WITH NOTCHED GUIDE STRIPS

FIELD AND BACKGROUND OF THE INVENTION

The present invention relates in general to slide valves, and in particular to a new and useful flat slide valve having notched guide strips.

The present invention is a flat slide valve, in particular to shut off flow in conveyor lines carrying thickish, powdery or granular media, with a slide plate guide slot provided in the valve housing, the guide slot having laterally limiting guide strip pairs which project into the valve flow channel of circular section and contain at least two mutually spaced notch pairs. Each notch pair has stripping edges interacting with shearing edges at the lower valve plate closing edge when the valve plate is being closed.

A flat slide valve of this design is described e.g. U.S. Pat. No. 4,546,788 (a Swiss patent application No. G 6908/81). The notches of each notch pair are in mutual alignment in the flow direction. During the time the valve is open, medium flushes the mutually aligned notches and the slot portion located between them, whereas the slot area located between the notch pairs forms a practically flowless dam-up space in which solids can deposit. Such deposits of the conveyed medium, depositing particularly on the guide surfaces of the guide strips interrupted by the notches, can be pushed down mechanically by the shearing edges of the valve plate when closing the valve and stripped off in interaction with the stripping edges of the notches in the guide strips, where they are picked up by the medium flow and flushed downstream. But if the valve stays open for a longer period of time, these deposits can solidify and build up into layers so thick in the guide slot portions located between the notch pairs that the application of considerable force is required, when subsequently closing the valve, to effect the scraping off of these deposits. This can prevent proper closing of the valve plate which is guided with as little clearance as possible. Furthermore, scraping off the encrusted deposits can also lead in time to damaging the guide surfaces of the guide strips.

SUMMARY OF THE INVENTION

The purpose of the present invention is the creation of a flat slide valve of the kind mentioned, in which deposits on guide slot portions located between the notches and particularly on the guide surfaces of the guide strips are made impossible to a great extent, and in which the build-up of relatively thick, encrusted deposit layers is avoided even when the valve stays open for longer periods of time. According to the invention, this is to be achieved in that self-cleaning through the flow of medium is brought about especially in the area of the guide strips delimiting the guide slot and provided with notches.

To serve this purpose, the flat slide valve according to the invention is characterized in that the notches in one guide strip of each guide strip pair is offset relative to those in the other guide strip.

Due to this offset of the notches provided in the guide strips of each guide strip pair, each notch of the one guide strip is opposite at least a part of the guide surface of the other guide strip. In the open position of the valve this results in medium entering the guide slot through the notches of the guide strip on the inflow side being deflected in the lengthwise direction of the guide slot by the opposite guide surface portion before the medium leaves the guide slot again through a notch in the guide strip on the outflow side. In this process, the medium wipes the guide slot portion located between the offset notches so that no thicker deposit layers can form on the respective guide surfaces.

Advantageously, the offset of the notches matches approximately the size of the greatest notch mouth width (e), with optimum flushing of the guide slot being obtained when the largest notch mouth width also equal approximately or is only slightly greater than half the notch pitch. The notch depth is slightly smaller than the depth of the guide slot which is delimited inside by a seal.

The transverse section of the notches in a plane parallel to the valve plate is of wedge or U shape, but may also be triangular or rectangular, and all notches may have the same sectional area. But in order to make certain, especially where larger valves with relatively long unnotched guide slot portions above the valve throat are involved, that deposits pushed down out of these slot portions by the valve plate shearing edges when closing the valve are actually picked up by the notches closest to these slot portions and flushed into the throat there, it may be expedient to make these upper notches somewhat bigger than the others.

It is advantageous for the lower valve plate edge, which is stepped in the transverse direction and equipped with shearing edges, to be of part-cylindrical design, its diameter being somewhat larger than the plate width. This leads to the lower plate rim transitioning via a transverse edge into the mutually parallel narrow valve plate sides and to the segment-shaped lower plate part being of short height. The spacing of the usual transverse seal from the valve throat, required to accommodate this segment portion of the valve plate in the open valve position, then becomes correspondingly small. By suitably widening the guide slot in the corner portions below and above the valve throat it is thus possible to form flushing corners flushed by the medium flow in the open valve position, thus keeping them free of larger deposits. What this achieves is that virtually the entire plate guidance system is subjected to a kind of self-cleaning action.

A critical point to be kept free of deposits which can hinder proper closing of the valve is always the lower seal portion which is more or less aligned with the throat and interacts with the apex portion of the valve plate. Here, the seal lies advantageously in a slot in the housing part on the inflow side, which slot narrows towards the throat. The housing part portion on the outflow side delimiting this slot projects by a few millimeters into the throat to serve as stop for the lower valve plate edge in closed position. This stop surface, located in the flow direction immediately behind the slot containing the seal, acts as a baffle in the open valve position, which can lead to deposits in front of this baffle in the seal area. Now, it has proven to be particularly advantageous to design the stepped lower plate edge on the inflow side with a groove of arched section. Immediately before closing the valve, this groove causes the medium impinging it to be deflected downwardly against the seal so that the turbulence originating there can rid the seal portion located in front of the stop surface of deposits by flushing. In the lateral area of the lower flushing corners the stop surface fades out, thus forming in these areas a stepless passage of the same level.

Accordingly, the above described measures lead to a self-cleaning action in the entire valve plate guide area surrounding the throat, thus assuring in conjunction with the mechanical cleaning provided by the interaction of the shearing edges of the valve plate and the stripping edges of the notches, that the valve plate always runs smoothly in the guide slot and that the valve always closes reliably and easily.

A still further object of the invention is to provide a flat shut-off valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention is illustrated in the annexed drawings wherein.

DESCRIPTION OF THE PREFERRED EMBODIMENT

Figure 1:
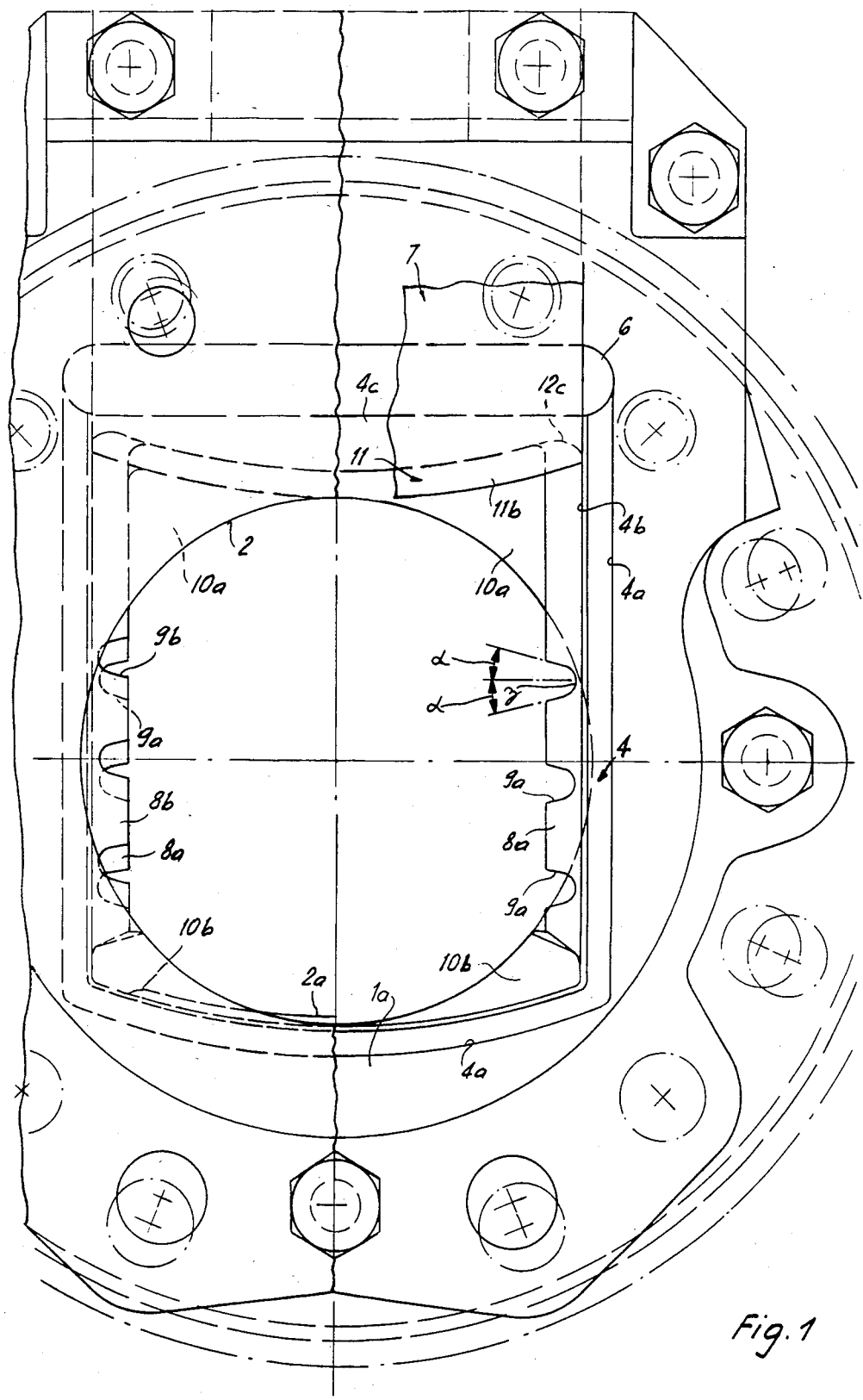
FIG. 1 is a partial elevational view of the valve, with the left half of the figure showing the valve as seen from the outflow side, the housing half on the outflow side being removed in the right half of the figure.
Figure 2:
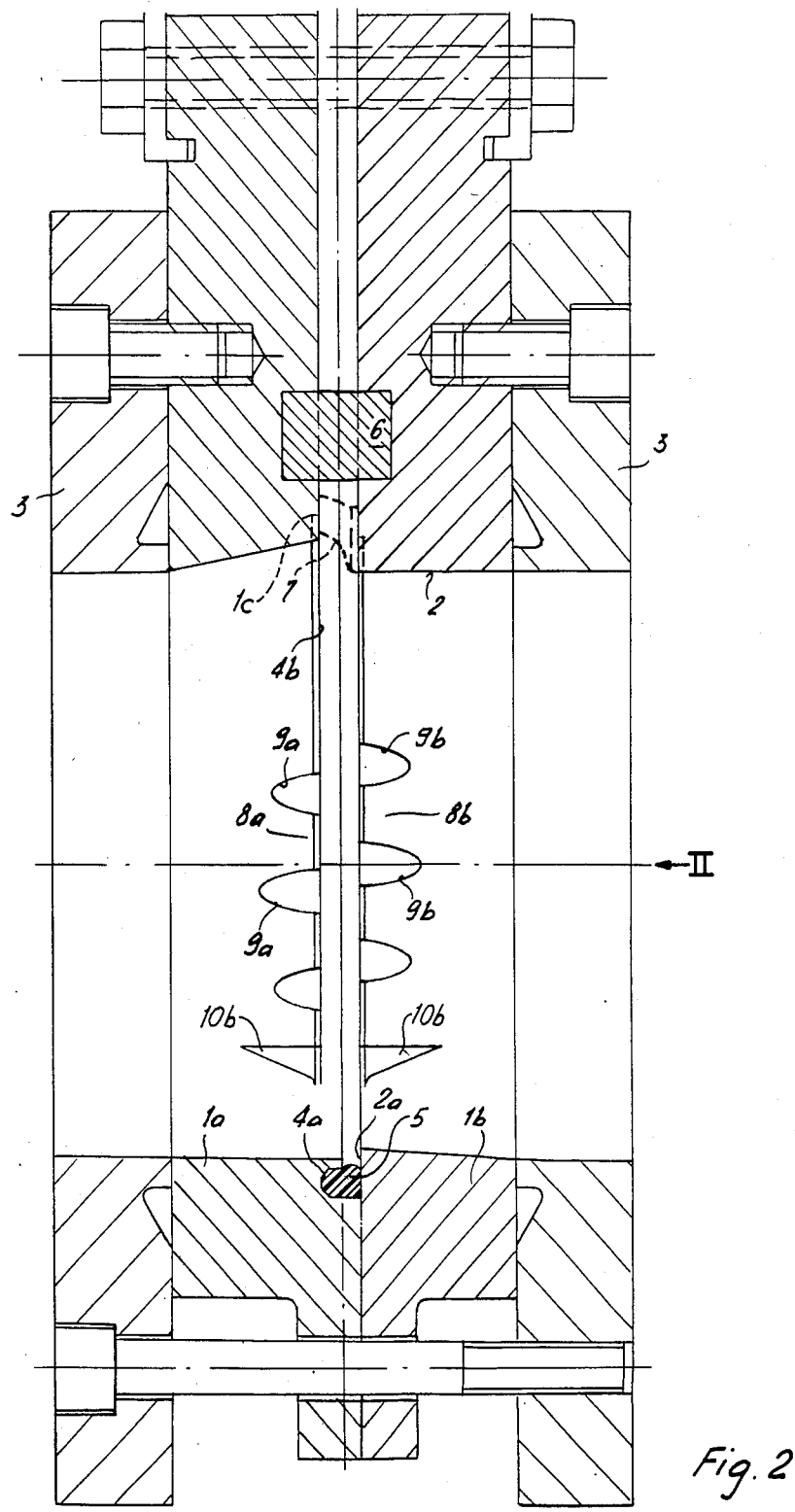
FIG. 2 is an axial sectional view in the direction of arrow II in FIG. 1 of the valve without valve plate.

The flat slide valve shown in the drawings has a two-piece housing 1a, 1b with a cylindrical flow channel 2. The housing parts 1a, 1b can be screwed to each other, as shown in FIG. 2 by means of supplemental flanges 3 (for special flange holes). Provided in the housing part 1a, on the inflow side is a stepped cutout 4 surrounding the flow channel 2 and having a U-shape. The narrowed portion 4a of cutout 4 serves as a sealing slot for the accommodation of a seal 5, extending in known manner up to the area of a transverse seal 6 at the top of the cutout 4. The widened portion 4b of the cutout 4 serves as guide slot for the valve plate 7. This guide slot 4b is bounded laterally by guide strip pairs 8a, 8b which project into the flow channel 2 where their outside surfaces are beveled in order not to form flow inhibiting baffles or undercuts. In the example shown, each one of these guide strip pairs 8a, 8b has three mutually spaced notch pairs 9a, 9b, the notches 9a of the one guide strip 8a being staggered in the flow direction relative to the notches 9b of the other guide strip 8b. The pitch t of the notches is approximately twice the mouth width e of the notches, whereas the notch depth b is slightly less than the depth of the guide slot 4b so that guidance of the valve plate is still assured also at the notched places of the guide strips. The offset v of the notches of the one guide strip relative to the notches of the other guide strip expediently matches approximately the mouth width of the notches. It goes without saying that number, size, pitch and offset of the notches may differ, depending on the valve size, i.e, the diameter of the flow channel 2. It has turned out in practice that, for slide valves of nominal widths from e.g. 50 to 300 mm, the notch pitch t is expediently between 20 and 25 mm, the notch offset v between 8 and 12 mm, the notch depth b between 7 and 10 mm (at a slot depth between 9 and 12 mm), and the notch mouth width e between 10 and 15 mm. In the example shown, the notch cross section taken parallel to the plane of movement of the valve plate 7 in its slot 4b, is wedge-shaped with a well rounded end portion 3 adjacent the base of the notch. It is advantageous for the inner, sharp notch edges to diverge toward the notch mouth at an angle d between 5° and 15° to the horizontal (FIG. 1) but they could also run parallel to each other at the notch mouth.

Figure 3:
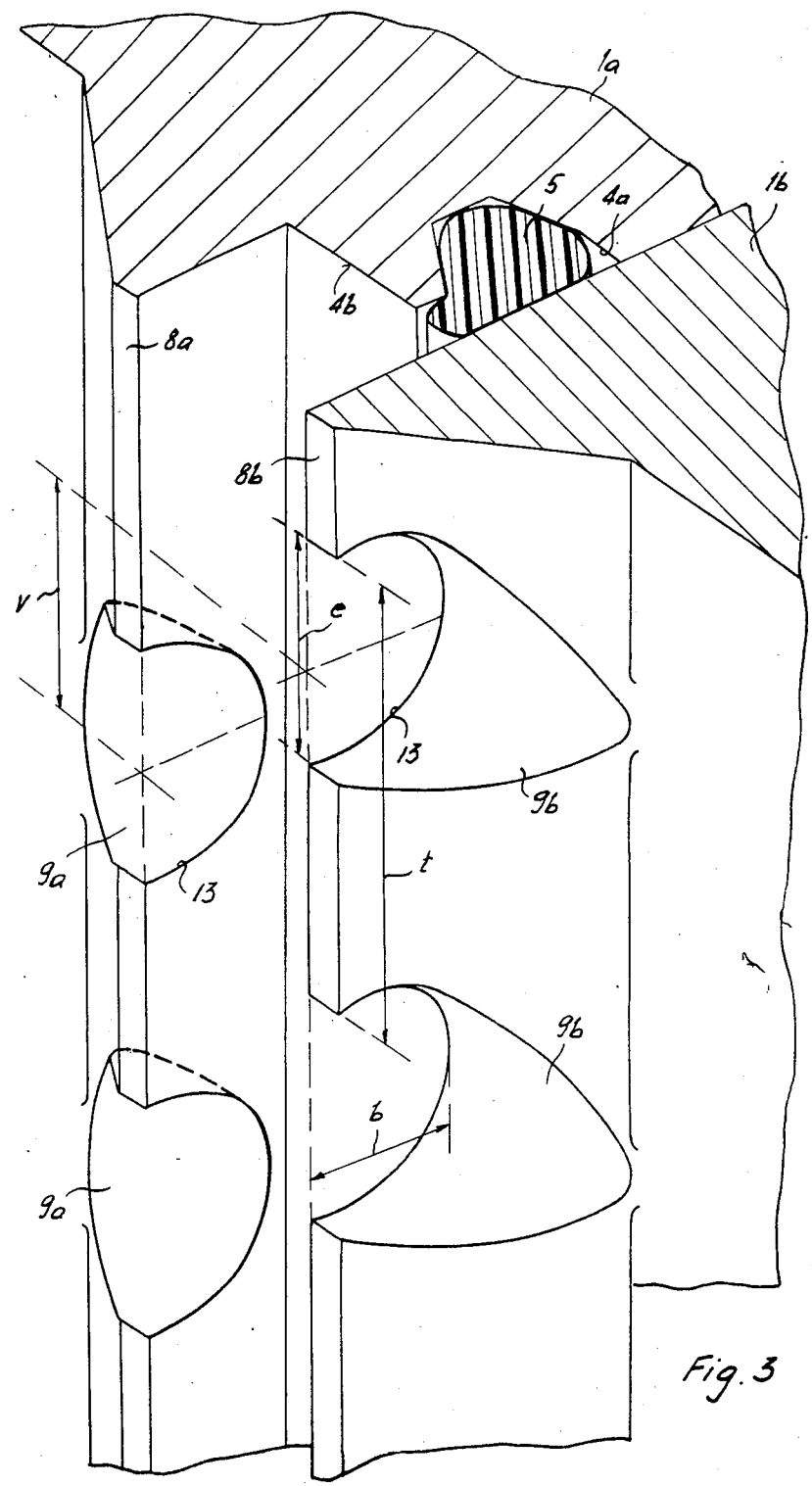
FIG. 3 is a partial perspective view of a guide slot of the valve per FIG. 1, on larger scale.
Figure 5:
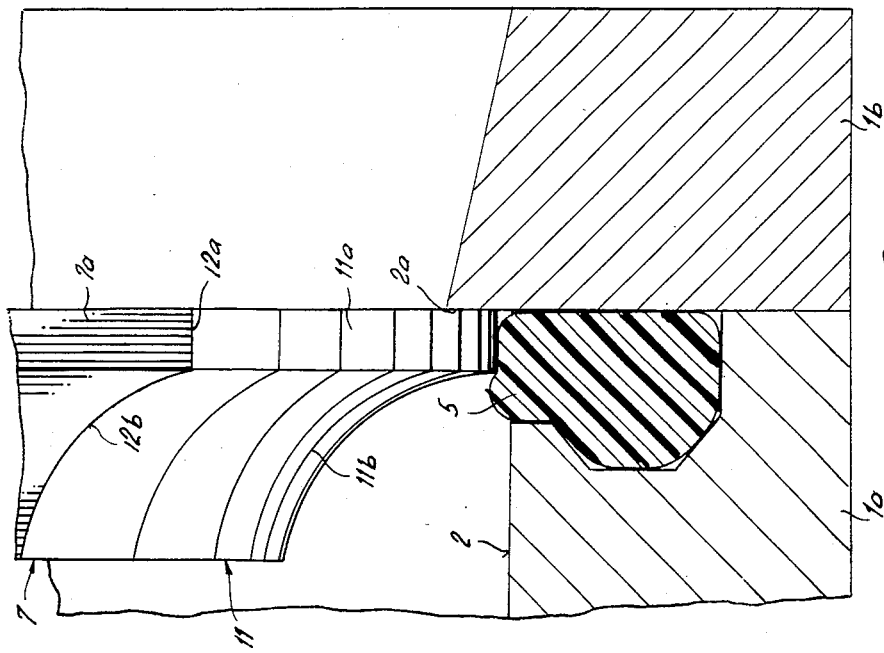
FIGS. 4 and 5 are details from FIG. 2 on a larger scale and with the valve plate immediately before and after closing of the valve plate, respectively.
Figure 4:
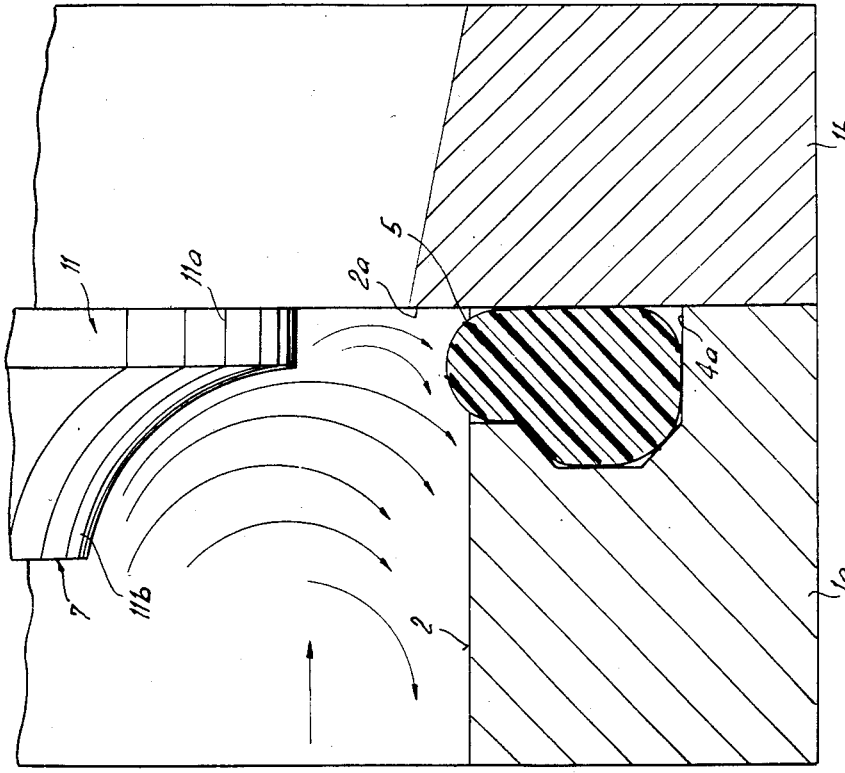

From the area of the flow channel 2 the lateral guide slots 4b run upwardly to a segment-shaped transverse slot portion 4c located directly under the transverse seal 6. Slot portion 4c ends above and outside of the flow channel 2. It is also spaced from the segment-shaped base portion of the seal slot 4a. The housing parts 1a and 1b, in the area between the guide slots 4b and 4c at the top, and between the guide slots 4b and the seal slot 4a at the bottom are recessed and thus form flushing corners 10a, 10b, respectively. These flushing corners are open toward the flow channel. As may be seen from the drawing at FIG. 2, the lower apex portion of the inside wall of the housing part 1b on the outflow side of the valve, which delimits the flow channel 2, rises slightly toward the plane of separation of the housing parts so as to project into the flow channel by a few millimeters, in practice 2 to 5 mm, depending on the nominal size of the valve. This projecting wall portion 2a can be seen on a larger scale in FIGS. 4 and 5 and in the flow direction serves as a stop for the lower closing edge 11 of the valve plate 7 in its closed position. The diameter of this segment-shaped closing edge 11 is somewhat larger than the plate width so that its part-cylindrical underside 11a forms an edge 12a with the narrow sides 7a of plate 7. In addition, the closing edge 11 of the valve plate 7 is stepped in the plate thickness direction, this step being formed by a groove or recess 11b and transitioning into the narrow side 7a of the valve plate 7 via an appropriately curved edge 12b in continuation of edge 12a (FIG. 5). The groove 11b of the closing edge 11 of the valve plate 7 faces the upstream direction. Except for short end sections 12c (FIG. 1), the stepped edge of the closing edge 11 on the inflow side runs identically to the lower edge of surface 11a. These end sections 12c, however, are curved concavely and terminate in the lateral groove edges 12b. These end sections 12c form shearing edges for interaction with the inner edges 13 (FIG. 3) of the notches 9a,9b acting as stripping edges. If media that is to pass through the valve is of the type that causes fouling, the end sections 12c may not be concave, but may extend to the narrow plate side 7a following the curvature of the stepped edge of closing edge 11.

When the valve is open, the closing edge 11 of the valve plate 7, being of but little height on account of its relatively large diameter (FIG. 1, left), is directly over the apex of the flow channel 2 and a short distance away from the transverse seal 6. As FIG. 1 shows, the segment shape of the closing edge 11 matches the curved shape of the lower edge of the guide slot portion 4c and the base portion of the seal slot 4a. This leads not only to relatively small upper and lower flushing corners 10a,10b, but also permits maintaining a relatively low height of the upper guidance portion for the valve plate. When closing the valve, the valve plate 7 moves downwardly, its narrow side edges 12a, 12b pushing deposits possibly sticking to the base of the guide slots 4b or to the seal 5 downwardly in the process. As the same time, the shearing edges 12c on the inflow side as well as the end sections of the lower edge of the closing edge 11 on the outflow side, which end sections are located in the guide slot, also cause deposits to be scraped off the guide surfaces. The rim portions of the closing edge 11 will push the scraped-off deposits in the guide slots downwardly, where they get into the range of the first notch pair 9a,9b and are wiped into these notches as the shearing edges 12c interact with the stripping edges 13 of the notches. Analogously, deposits in the guide slot sections between the notches are scraped off and wiped into the next notch pair or into the lower flushing corners 10b. Since the notches 9a, 19b as well as the upper and lower flushing corners are exposed to the medium current, the arriving deposits are continuously blown out of the notches or flushing corners in pneumatic operation or expelled and floated along in hydraulic operation. On the other hand, in the open position of the valve plate 7, the offset of the notches 9a in relation to the notches 9b has caused parts of the medium current entering the guide slot 4b through the notches 9a of the one guide strip 8a on the inflow side to be deflected in the guide slot 4b so that they can leave it again through the nearest notch 9b of the other guide strip 8b only after wiping over a slot portion corresponding to the notch offset. This constant wiping over parts of the guide surfaces of the guide slot prevents the formation on these guide surface of thicker and hard to scrape off deposit layers. Thus, effective self-cleaning is assured not only in the area of the upper and lower flushing corners 10a, 10b, but also in the lateral guide slots 4b located in the area of the flow channel 2.

It has been presumed in the foregoing that all notches are of the same size or mouth opening. But since the unnotched area of the guide slot 4b which is open towards the flushing corners 10a and located above the flow channel 2 is relatively large and bigger sized deposits can form there if the valve is kept open for longer periods of time, the notches of the uppermost notch pair may also be made somewhat bigger so that they can absorb greater amounts of deposits scraped off in the upper guide slot area.

One particularly critical spot with respect to deposits able to hinder proper closing of the valve plate is the lower apex portion of the flow channel 2, where the projecting wall portion 2a generates on the inflow side a kind of dead space in which deposits are almost unavoidable. As may be seen from FIG. 4, the pronounced fillet surface of recess 11b of the closing rim 11 of plate 7 causes, directly before closing, the deflection of the medium impinging this fillet surface to form a strong, downwardly directed vortex which certainly is in a position to blow deposits out of the dead space back into the remaining medium flow or to float them away. Thus, an effective self-cleaning action is assured here also, making perfect closing of of the valve possible as the valve plate 7 (FIG. 5) is lowered further.

While a specific embodiment of the invention has been shown and described in detail to illustrate the application of the principles of the invention, it will be understood that the invention may be embodied otherwise without departing from such principles.

What is claimed is:

1. A flat slide valve for the shut-off of conveyor lines carrying thick, powdery or granular media, comprising a valve housing having a valve flow channel of circular section extending therethrough for the passage of media in a flow direction, a guide slot defined in said housing bounding said flow channel, and laterally limiting guide stip pairs on opposite sides of said guide slot in the flow direction, and a slide plate movable transversely to the flow direction in said guide slot between said guide strip pairs, each guide strip of said laterally limiting guide strip pairs having at least two mutually spaced notch pairs each having a stripping edge, said slide plate having a shearing edge which interacts with said stripping edges as said slide plate moves in said guide slot, said slide plate having a lower valve plate closing edge, said notches of one guide strip being offset with respect to said notches of the other guide strip of each guide strip pair in said flow direction, said at least two mutually spaced notch pairs each having notches which are spaced apart by a notch pitch, each notch of each notch pair having a notch mouth width, and said guide slot having a guide slot depth transverse to said flow direction.

2. A flat slide valve according to claim 1, wherein the notch offset is greater than half the notch mouth width.

3. A flat slide valve according to claim 2, wherein the notch offset equals approximately the notch mouth width and approximately half the notch pitch.

4. A flat slide valve according to claim 1, wherein the notch depth is less than the depth of the guide slot.

5. A flat slide valve according to claim 1, wherein the notches are one of arc, triangular and rectangular section.

6. A flat slide valve according to claim 1, wherein the notches of the uppermost notch pair for each guide strip pair have a mouth opening wider than that of the other notches.

* * * * *